US009470151B2

(12) United States Patent
Ruberte Sanchez et al.

(10) Patent No.: US 9,470,151 B2
(45) Date of Patent: Oct. 18, 2016

(54) ALIGNMENT SYSTEM AND METHODOLOGY TO ACCOUNT FOR VARIATION IN A GAS TURBINE ENGINE

(71) Applicant: United Technologies Corporation, Hartford, CT (US)

(72) Inventors: Jose E. Ruberte Sanchez, Jupiter, FL (US); Joey Wong, Enfield, CT (US); Mark J. Ricciardo, Royal Palm Beach, FL (US); Russell B. Hanson, Jupiter, FL (US)

(73) Assignee: United Technologies Corporation, Farmington, CT (US)

( * ) Notice: Subject to any disclaimer, the term of this patent is extended or adjusted under 35 U.S.C. 154(b) by 825 days.

(21) Appl. No.: 13/725,312

(22) Filed: Dec. 21, 2012

(65) Prior Publication Data

US 2014/0174088 A1     Jun. 26, 2014

(51) Int. Cl.
| | |
|---|---|
| *F02C 7/20* | (2006.01) |
| *F02K 1/80* | (2006.01) |
| *F02K 3/10* | (2006.01) |
| *F16B 35/04* | (2006.01) |
| *F01D 25/16* | (2006.01) |
| *F16B 33/00* | (2006.01) |
| *F16B 43/00* | (2006.01) |

(52) U.S. Cl.
CPC ............... *F02C 7/20* (2013.01); *F01D 25/162* (2013.01); *F02K 1/80* (2013.01); *F02K 3/10* (2013.01); *F16B 35/048* (2013.01); *F05D 2260/31* (2013.01); *F16B 33/002* (2013.01); *F16B 43/001* (2013.01)

(58) Field of Classification Search
CPC ............ F02K 3/10; F02K 1/80; F02K 9/343; F02C 7/20; F05D 2240/90; F05D 2240/91; F05D 2260/31; F16B 33/001; F16B 33/002; F16B 5/025; F16B 5/0225; F16B 5/0275; F16B 43/001; F16B 35/048; F16B 35/041; F16B 35/042; F16B 35/044
See application file for complete search history.

(56) References Cited

U.S. PATENT DOCUMENTS

| | | | | |
|---|---|---|---|---|
| 1,732,993 | A | * 10/1929 | Spiro | .................... F16B 5/0225 16/DIG. 39 |
| 2,820,499 | A | * 1/1958 | Schaaf | .................... F16B 5/025 411/103 |
| 2,846,250 | A | * 8/1958 | Davis | ....................... F02C 7/20 403/108 |
| 3,710,673 | A | * 1/1973 | Fuqua | ...................... F16B 5/02 411/53 |
| 4,029,966 | A | 6/1977 | Baker et al. | |
| 4,170,110 | A | 10/1979 | Radin | |
| 4,720,971 | A | 1/1988 | DuBell | |
| 4,901,527 | A | * 2/1990 | Nash | ........................ F23R 3/20 60/749 |
| 5,076,053 | A | 12/1991 | McVey et al. | |
| 5,117,628 | A | 6/1992 | Koshoffer | |
| 5,129,226 | A | 7/1992 | Bigelow et al. | |
| 5,230,214 | A | 7/1993 | Pechette | |
| 5,335,490 | A | 8/1994 | Johnson et al. | |
| 5,385,015 | A | 1/1995 | Clements et al. | |
| 5,491,974 | A | 2/1996 | Shimmel et al. | |
| 5,617,717 | A | 4/1997 | Asquith et al. | |
| 5,685,140 | A | 11/1997 | Clements et al. | |
| 5,829,246 | A | 11/1998 | Abrams et al. | |

(Continued)

*Primary Examiner* — Alexander Comley
*Assistant Examiner* — Kenneth J Hansen
(74) *Attorney, Agent, or Firm* — O'Shea Getz P.C.

(57) ABSTRACT

A gas turbine engine includes a bushing that is non-round in cross-section, the bushing receivable within an aperture. A fastener passes through the bushing to retain a second component to a third component with respect to the first component.

8 Claims, 26 Drawing Sheets

(56) References Cited

U.S. PATENT DOCUMENTS

| | | |
|---|---|---|
| 5,927,067 A | 7/1999 | Hanloser et al. |
| 6,334,303 B1 | 1/2002 | Berglund et al. |
| 6,463,739 B1 | 10/2002 | Mueller et al. |
| 7,128,082 B1 | 10/2006 | Cerretelli et al. |
| 7,602,096 B2 | 10/2009 | Muldoon |
| 7,603,862 B2 | 10/2009 | Steele |
| 7,954,328 B2 | 6/2011 | Atassi |
| 8,209,987 B2 | 7/2012 | Hautman et al. |
| 8,235,345 B2 | 8/2012 | Sadil et al. |
| 2010/0040431 A1* | 2/2010 | Suzuki ............... F16B 5/0275 411/166 |

* cited by examiner

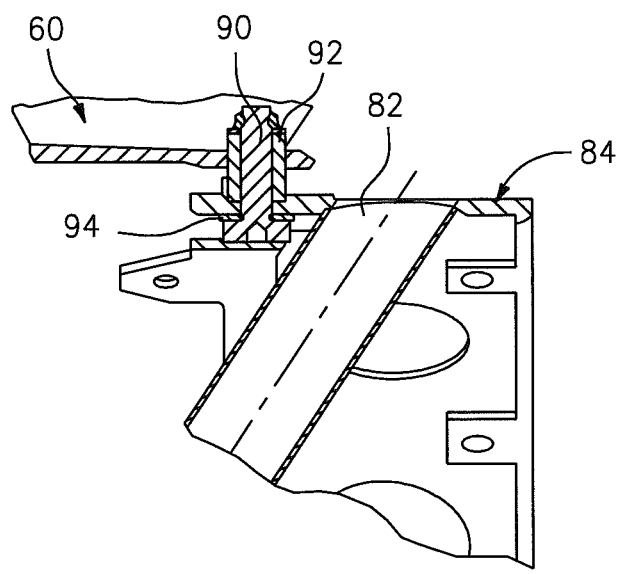
*FIG. 5*
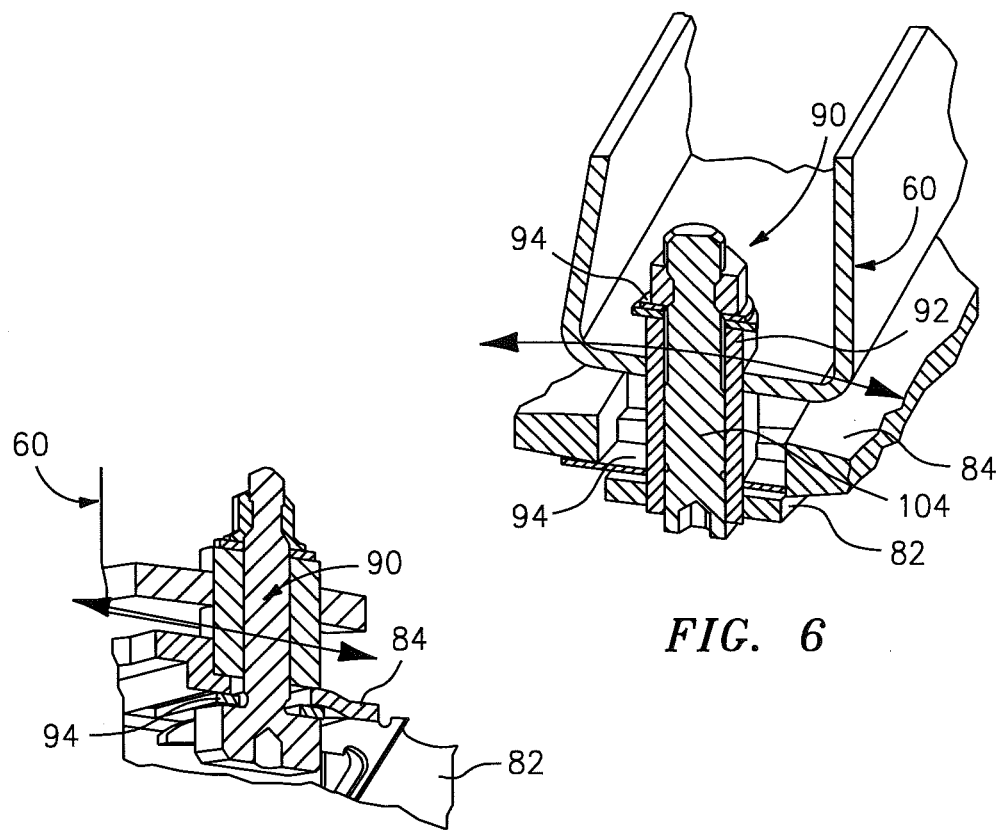
*FIG. 6*
*FIG. 7*

ALIGNMENT SYSTEM AND METHODOLOGY TO ACCOUNT FOR VARIATION IN A GAS TURBINE ENGINE

STATEMENT REGARDING FEDERALLY SPONSORED RESEARCH OR DEVELOPMENT

This disclosure was made with Government support under N00019-02-C-3003 awarded by The United States NAVY. The Government has certain rights in this invention.

BACKGROUND

The present disclosure relates to gas turbine engines, and more particularly to an alignment system within an augmentor section therefor.

Gas turbine engines, such as those which power modern military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, an augmentor section, or "afterburner", is operable to selectively increase the thrust. The increase in thrust is produced when oxygen contained within the core gas flow of the engine downstream of the turbine section is injected with fuel and burned to generate a second combustion.

Due in part to the harsh environment of the second combustion within the augmentor section, strict alignment requirements of the numerous components may pose a challenge to assembly and maintenance.

SUMMARY

An alignment system according to one disclosed non-limiting embodiment of the present disclosure includes a bushing with a set of tabs; and a fastener with a threaded section, an interface section and a head, said head receivable between said set of tabs.

In a further embodiment of the foregoing embodiment, the interface section is axially between said threaded section and said head. In the alternative or additionally thereto, in the foregoing embodiment the interface section corresponds with a bushing aperture through said bushing. In the alternative or additionally thereto, in the foregoing embodiment the interface section and said threaded section is rectilinear.

In a further embodiment of any of the foregoing embodiments, the set of tabs includes two (2) tabs.

In a further embodiment of any of the foregoing embodiments, the system includes an undercut between each of said tabs of said set of tabs and a body of said bushing.

In a further embodiment of any of the foregoing embodiments, the system includes a seal with an aperture to receive said set of tabs.

A gas turbine engine according to another disclosed non-limiting embodiment of the present disclosure includes a first component with an aperture, a bushing that is non-round in cross-section, said bushing receivable within said aperture; and a fastener which passes through a bushing to retain a second component to a third component with respect to said first component, said third component with an elongated aperture greater in size than said aperture, said elongated aperture located within a recess, and In a further embodiment of the foregoing embodiment, the first component is a trailing edge box within an augmentor section of said gas turbine engine.

In a further embodiment of any of the foregoing embodiments, the second component is a flame tube within an augmentor section of said gas turbine engine.

In a further embodiment of any of the foregoing embodiments, the third component is a flame tube ring within an augmentor section of said gas turbine engine.

In a further embodiment of any of the foregoing embodiments, the bushing includes a set of tabs and said fastener includes a head receivable between said set of tabs.

In a further embodiment of any of the foregoing embodiments, the fastener includes a rectilinear interface section that corresponds with a rectilinear bushing aperture through said bushing.

In a further embodiment of any of the foregoing embodiments, the system includes a pin which extends from said second component, said pin engageable with a bracket retained to said third component with said fastener.

In a further embodiment of any of the foregoing embodiments, the fastener includes an inverted "T"-shaped head.

In a further embodiment of any of the foregoing embodiments, the fastener includes an "L"-shaped head.

In a further embodiment of any of the foregoing embodiments, the system includes a tapered recess integral with said third component and a tapered bracket receivable in said tapered recess, said tapered bracket retained to said third component with said fastener.

In a further embodiment of any of the foregoing embodiments, the system includes a tapered recess integral with said third component and a tapered bracket receivable in said tapered recess, said tapered bracket retained to said third component with said fastener.

A method of alignment assessment of clearances between features that permit a limited rotation according to another disclosed non-limiting embodiment of the present disclosure includes quantifying a range of rotation of a clearance interaction as a numerical value by integrating tolerances that correspond to features that permit a limited rotation to obtain a rotational assessment; and applying the rotational assessment to a tolerance stack-up.

In a further embodiment of the foregoing embodiment, the method includes multiplying the numerical value of the rotational assessment if the feature that permits the limited rotation is displaced from the clearance interaction.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 5 is a sectional view of an alignment system according to one disclosed non-limiting embodiment within the augmentor section;

FIG. 6 is a circumferential sectional view of the alignment system of FIG. 5;

FIG. 7 is an axial sectional view of the alignment system of FIG. 5;

DETAILED DESCRIPTION

Figure 1:
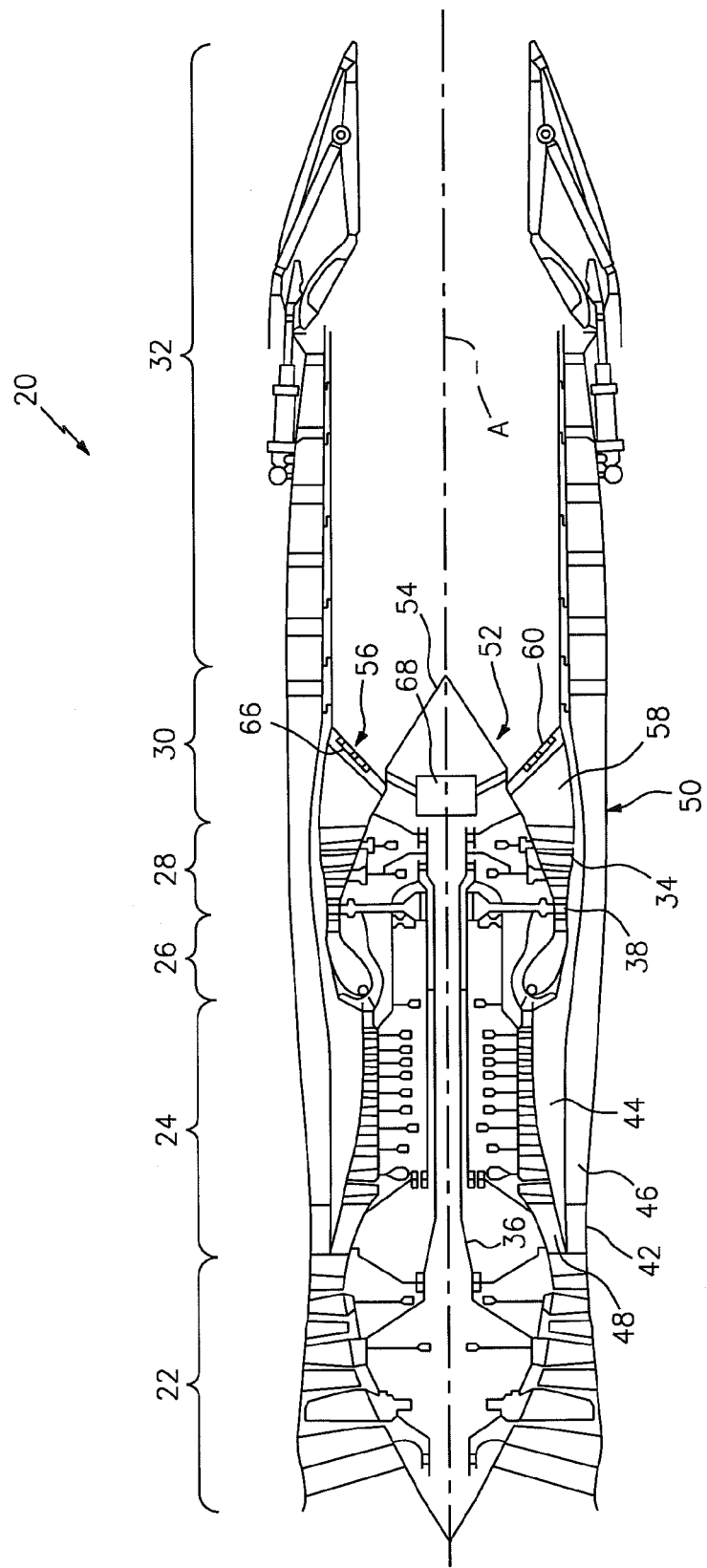
FIG. 1 is a general schematic view of an exemplary gas turbine engine embodiment for use with the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26, a turbine section 28, an augmenter section 30 and a nozzle section 32. The sections are defined along a central longitudinal engine axis A. Although depicted as an augmented low bypass gas turbine engine in the disclosed non-limiting embodiment, it should be understood that the concepts described herein are applicable to other gas turbine engines including geared architecture engines, direct drive turbofans, turbojet, turboshaft and other engine architectures.

The compressor section 24, the combustor section 26 and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

An outer engine case structure 42 and an inner engine structure 44 define a generally annular secondary flow path 46 around a core flow path 48 of the engine core. It should be understood that various structure within the engine may define the outer engine case structure 42 and the inner engine structure 44 which essentially define an exoskeleton to support the core engine therein.

Air which enters the fan section 22 is divided between a core flow through the core flow path 48 and a secondary flow through the secondary flow path 46. The core flow passes through the combustor section 26, the turbine section 28, then the augmentor section 30 where fuel may be selectively injected and burned to generate additional thrust through the nozzle section 32. The secondary flow may be utilized for a multiple of purposes to include, for example, cooling and pressurization. The secondary flow as defined herein is any flow different from the primary combustion gas exhaust core flow. The secondary flow passes through an annulus defined by the outer engine case structure 42 and the inner engine structure 44 then may be at least partially injected into the core flow adjacent the nozzle section 32.

The augmenter section 30 generally includes a turbine exhaust case (TEC) 50 and a center body 52 with a conically shaped tail cone 54 symmetric around the engine axis A. Circumferentially arrayed vanes 56 extend generally radially between the center body 52 and the TEC 50. Each of the vanes 56 may be an assembly of a leading main body portion 58 and a trailing edge box 60. That is, the trailing edge box 60 generally forms an aft end section of each vane 56. The vanes 56 have circumferentially opposite first and second sides 62, 64 (FIG. 2).

Figure 3:
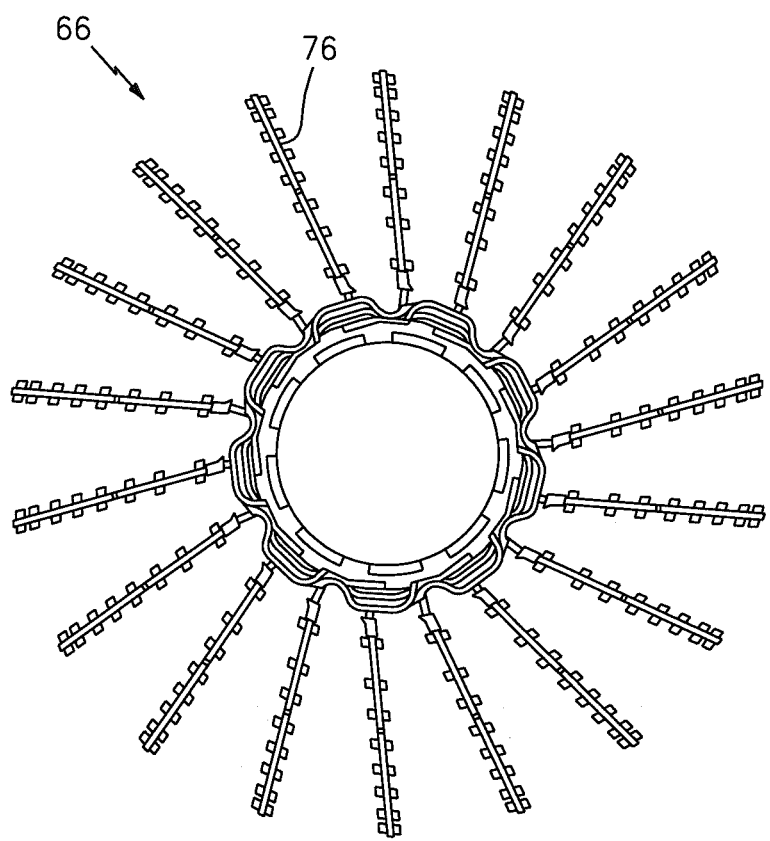
FIG. 3 is an end view of a fuel spraybar in the augmentor section of the gas turbine engine.

Each or particular trailing edge boxes 60 may contain a spraybar 66 (FIG. 3) to spray additional fuel into the core gas flow. The center body 52 may contain a burner pilot 68 to combust fuel and pilot combustion of the fuel from the spraybars 66. It should be appreciated that the burner pilot 68 may alternatively be located external to the center body 52 and that various augmented engines architectures including three-stream variable cycle engines will also benefit herefrom.

Figure 2:
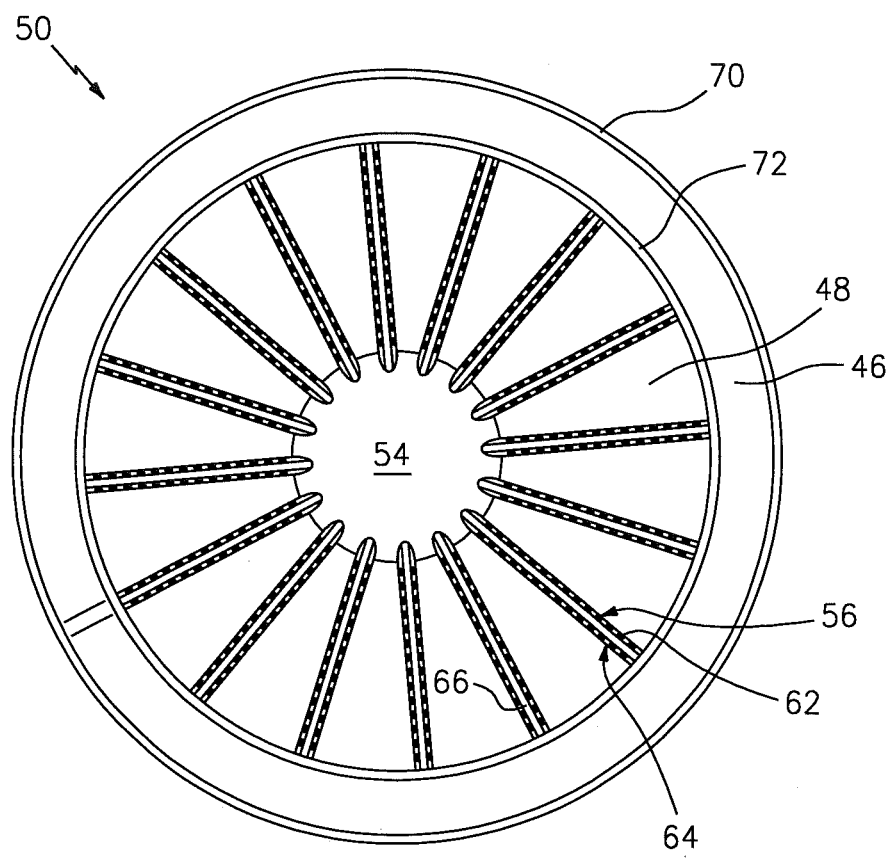
FIG. 2 is an end view of an augmentor section of the gas turbine engine.

With reference to FIG. 2, the TEC 50 generally includes an outer case 70 of the outer engine case structure 42 and a concentrically spaced inner liner 72 that operates as a heat shield to protect the outer case 70 from the extremely hot combustion gases in the flow path. Air discharged from the fan section 22 is communicated through the annular passageway 46 defined by the outer case 70 and the inner liner 72. Since fan air F is relatively cool compared to the hot gases C in the core flow path 48, the fan air F may be used to cool the components of the augmentor to enhance the life and reliability thereof.

Figure 4:
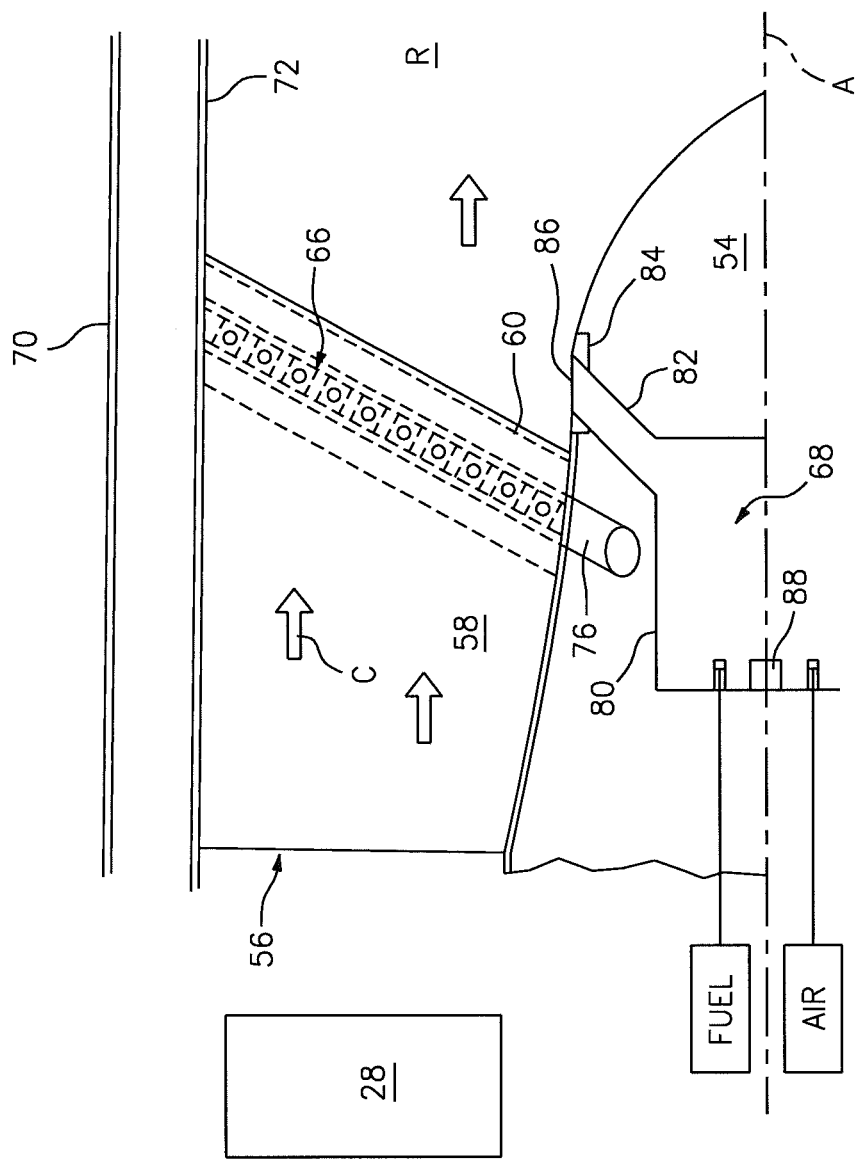
FIG. 4 is an expanded sectional view of a vane of the augmentor section.

With reference to FIG. 4, the configuration of the inner liner 72 together with the shape of the tail cone 54 defines a generally divergent annular passageway R. The fuel spraybars 66 generally include a multiple of fuel injection tubes 76. When the augmentor is activated, fuel is communicated into the fuel injection tubes 76 and injected into the generally divergent annular passageway R. The burner pilot 68 ignites and pilots the fuel injected by the spraybars 66 for stable augmentor and thrust increased operation. The burner pilot 68 generally includes a pilot combustor 80, a multiple of flame tubes 82 and a flame tube ring 84. The flame tube ring 84 defines a multiple of flame tube openings 86 each of which receives one of the multiple of flame tubes 82.

Fuel and air injected into the pilot combustor 80 is ignited by an igniter 88 that ignites the pilot fuel-air mixture in the burner pilot 68 for communication through the flame tubes 82. The burner pilot 68 serves to propagate the flame into the generally divergent annular passageway R by communication of the hot combustion gases from the burner pilot 68 through the flame tubes 82 downstream of the vanes 56. The hot gases discharged from the flame tubes 86 ignite the fuel sprayed from spraybars 66. Although a particular architecture for the augmentor section 30 is disclosed in the illustrated non-limiting embodiment, it should be appreciated that various configurations will benefit herefrom.

With reference to FIG. 5, the trailing edge boxes 60 are mounted to the TEC 50. The multiple of flame tubes 82 are aligned with the trailing edge box 60 with a multiple of alignment systems 90 to account for trailing edge box 60 circumferential (FIG. 6) and axial (FIG. 7) misalignment while at the same time accommodates component tolerances. The multiple of alignment systems 90 facilitate stringent positioning/alignment of components in a cost effective and maintainability friendly alternative to classified components. The design configuration of the alignment systems 90 further decreases "rocking" by a reduced number of components in the tolerance stack as well as accommodates component variation in assembly and due to operation. "Rocking" as defined herein is the predetermined movement permitted by the difference in size of an object bounded by a larger object.

Figure 8:
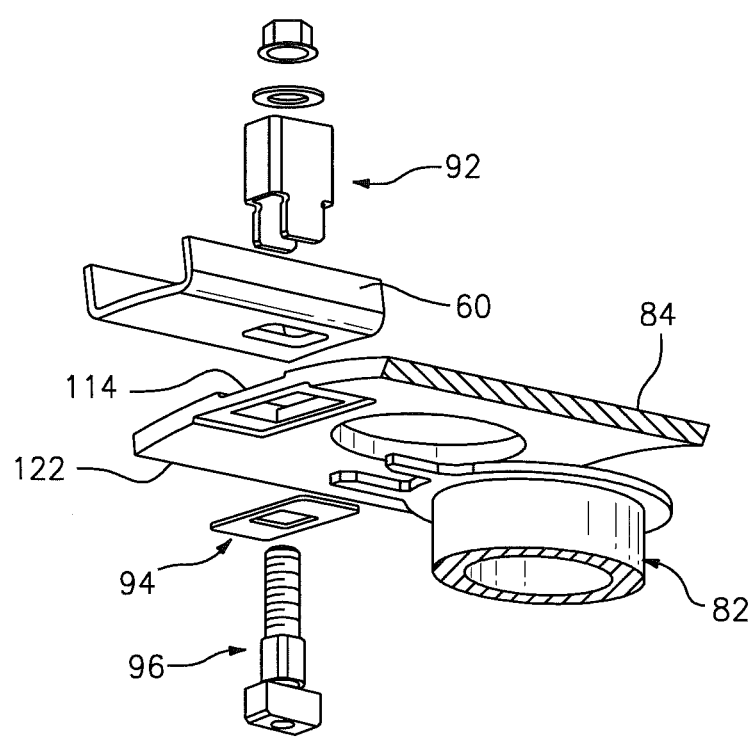
FIG. 8 is an exploded view of the alignment system of FIG. 5 looking aft.
Figure 9:
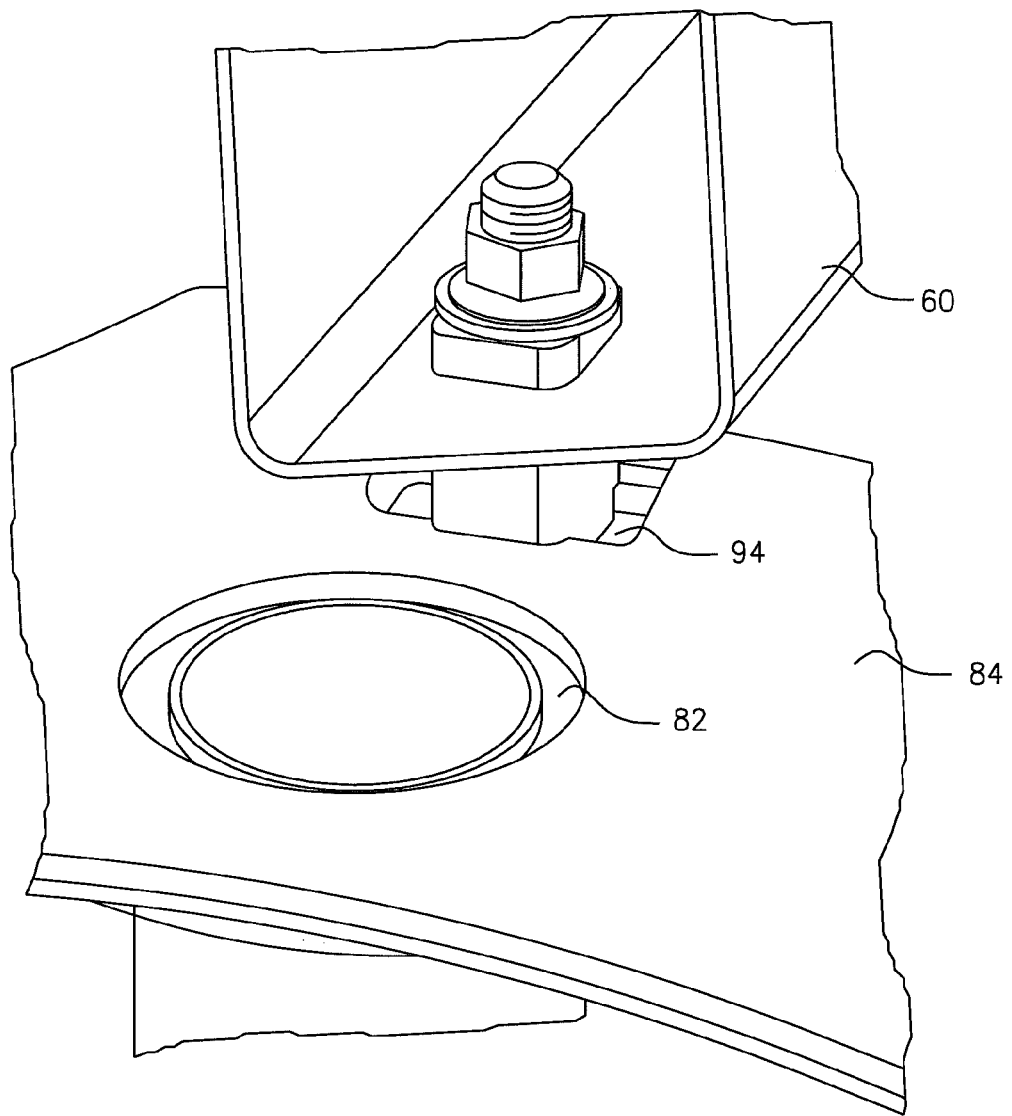
FIG. 9 is an expanded partial sectional view of the alignment system of FIG. 5 looking forward.

With reference to FIG. 8, each of the alignment systems 90 generally includes a bushing 92, a seal 94, and a fastener 96. Each alignment system 90 mounts a flame tube 82 to the flame tube ring 84 with respect to the trailing edge box 60 (FIG. 9). It should be appreciated that the alignment system 90 described herein may be utilized for other components that must account for circumferential and axial misalignment while at the same time accommodate component tolerances. Furthermore, the alignment systems 90 may be utilized to mount one component with respect to another.

Figure 10:
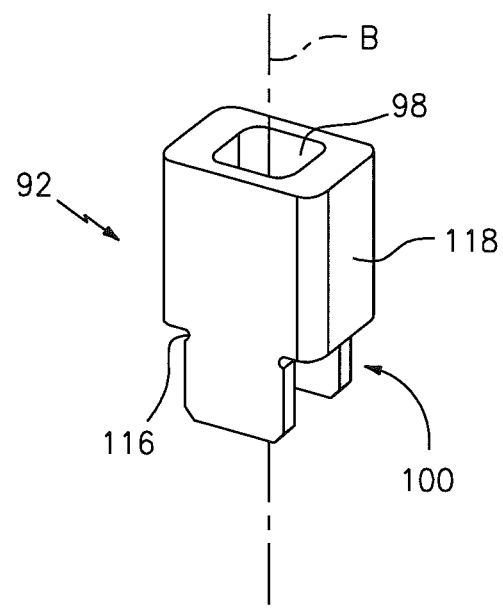
FIG. 10 is an expanded view of a bushing of the alignment system of FIG. 5.

With reference to FIG. 10, the bushing 92 is generally rectilinear in lateral cross-section across an axis B with a bushing aperture 98 along axis B. A set of tabs 100 flank axis B and extend from two sides of the bushing 92. The set of tabs 100 extend through the flame tube ring 84 to directly interact with an alignment feature that extends from the flame tube 82. This geometry eliminates the tolerance of the fastener when misalignment due to part tolerances are calculated. The bushing aperture 98 may be rectilinear (shown), round or other shape. "Rectilinear" as defined herein includes any non-round shape such as hex shaped, racetrack shaped, oval, etc.

Figure 11:
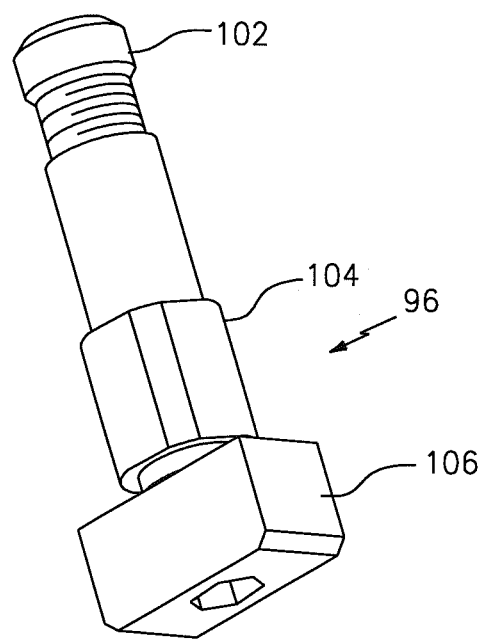
FIG. 11 is an expanded generally outer partial sectional view of a fastener of the alignment system of FIG. 5.
Figure 12:
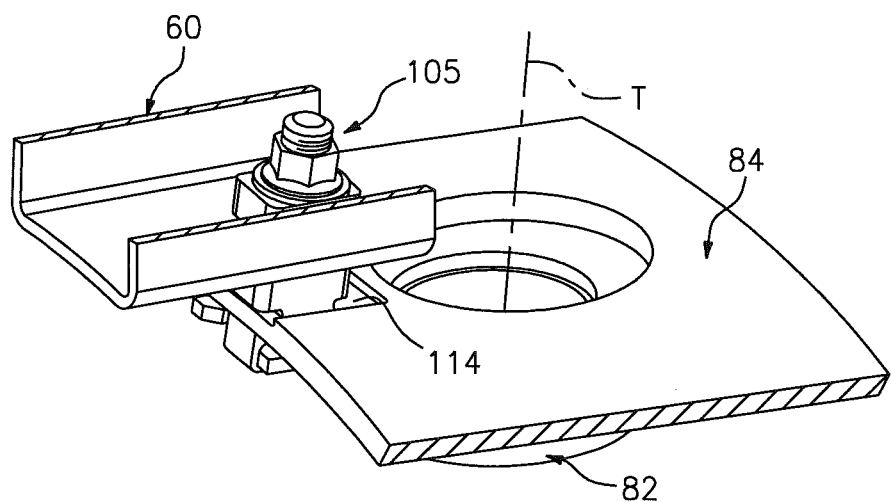
FIG. 12 is an expanded generally inner partial sectional view of the alignment system of FIG. 5.

With reference to FIG. 11, the fastener 96 may be a bolt with a threaded section 102, an interface section 104, and a head 106. The threaded section 102 is operable to receive a washer and nut 105 that are greater in diameter than the bushing aperture 98 (FIG. 12). The interface section 104 may be rectilinear (shown), round or other shape to correspond with the bushing aperture 98. The non-round interface section 104 and the bushing aperture 98 provide an anti-rotation interface therebetween. The head 106 may also be non-round in cross-section to fit between the set of tabs 100. The head 106 and tabs 100 may alternatively operate as an anti-rotation feature if the fastener 96 does not include the interface section 104.

Figure 13:
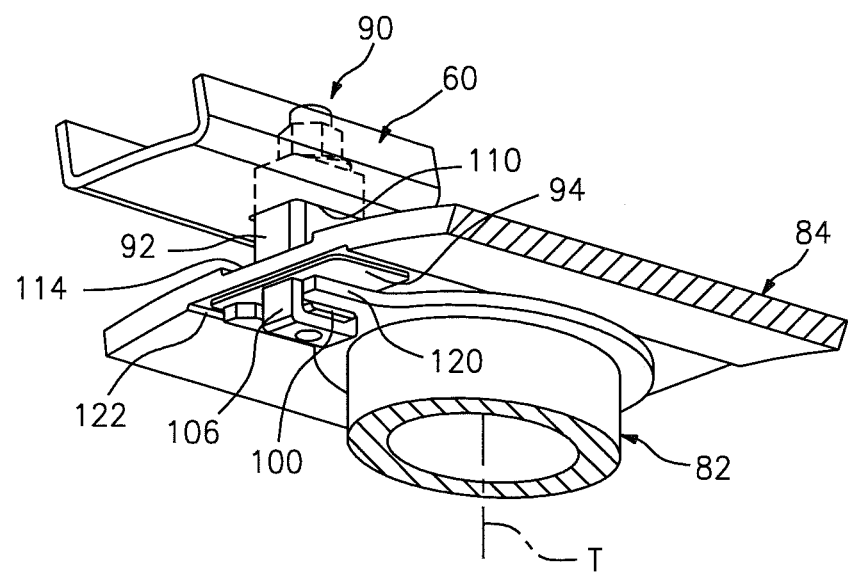
FIG. 13 is an expanded generally inner partial sectional view of the alignment system of FIG. 5.
Figure 14:
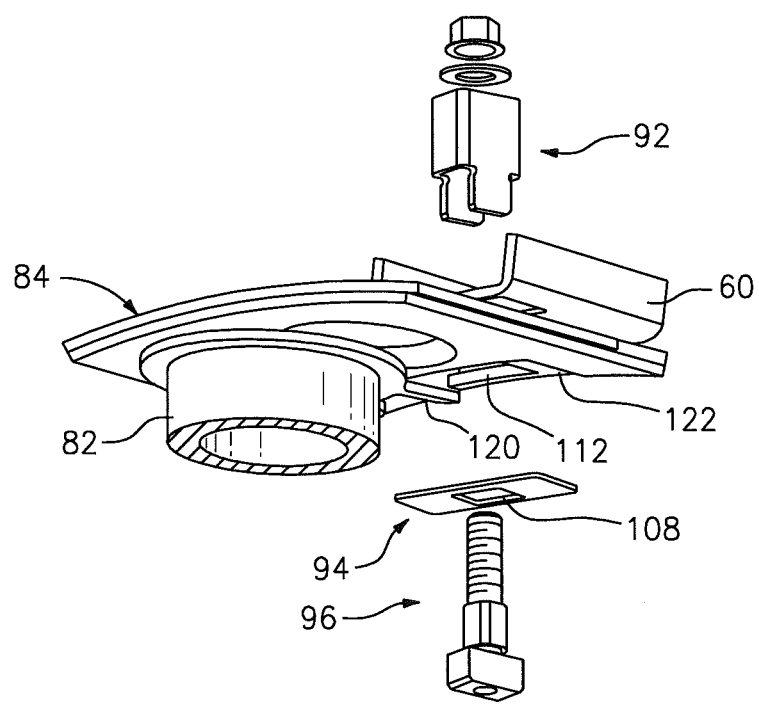
FIG. 14 is an exploded view of the alignment system of FIG. 5 looking forward.

With reference to FIG. 13, the seal 94 may be manufactured of sheet metal plate to reduce leakage. The seal 94 includes a seal aperture 108 (FIG. 14) to receive the set of tabs 100 therethrough. That is, the seal aperture 108 may be generally rectilinear.

The trailing edge box 60 (partially shown) each includes a aperture 110 that is sized with respect to the bushing 92, e.g., the aperture 110 and the bushing 92 may both be rectilinear or non-round in shape. That is, the bushing 92 is sized to pass through the aperture 110 with minimal "rocking". Again, "rectilinear" as defined herein includes any non-round shape such as hex shaped, racetrack shaped, oval, etc.

The flame tube ring 84 includes an elongated aperture 112 (FIG. 14) that is sized with respect to the set of tabs 100 such that the tabs 100 but not the entire bushing 92 may pass therethrough. The flame tube ring 84 may additionally include an outer recessed area 114 around the elongated aperture within which the bushing 92 may reside. The set of tabs 100 may include an undercut 116 at the interface between the tabs 100 and a body 118 of the bushing 92 (FIG. 11) to facilitate sliding movement and reduce tolerance components in the interface within the elongated aperture 112 and minimize stress risers.

With continued reference to FIG. 13, a fork 120 that extends from the flame tube 82 is also sized to receive the tabs 100 therebetween. That is, the fork 120 extends transverse to an axis T defined by the flame tube 82 and is axially positioned to about the bushing 92 and/or bolt 96. Although a fork 120 is illustrated in the disclosed, non-limiting embodiment, other interfaces such as pinning, fastening, etc., may alternatively be provided.

The aperture 108 receives the set of tabs 100 therethrough such that the seal 94 may be trapped between the flame tube ring 84 and the bolt 96. The fork 120 could also be utilized to trap the seal 94. The flame tube ring 84 may additionally include an inner recessed area 122 opposite the outer recessed area 114 within which the seal 94 may reside. As the aperture 108 closely corresponds with the set of tabs 100, the seal 94 operates to seal the relatively larger elongated aperture 112 of the flame tube ring 84 irrespective the misalignment that may exist between the trailing edge box 60 and the flame tube ring 84.

The head 106 fits within the tabs 100 that fit within the fork 120. The fastener 96 thereby sets the axial position of the flame tube 82 and clamps all the components. The tabs 100 reduce rocking through the interface with the fork 120 to provide circumferential alignment. The interface section 104 provides an anti-rotation feature and the seal 94 minimizes leakage through the elongated opening 112.

Figure 15:
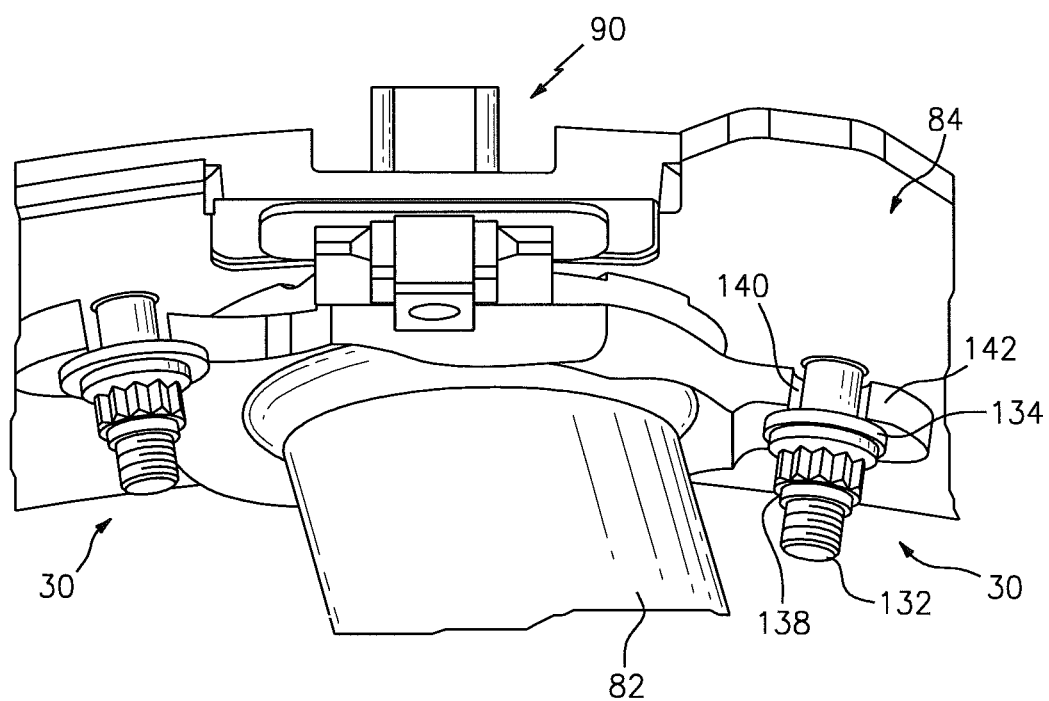
FIG. 15 is an expanded rear view of the alignment system of FIG. 5 illustrating a secondary flame tube fastener system.

With reference to FIG. 15, each flame tube 82 may further include secondary fasteners 130 that mount the flame tube 82 to the flame tube ring 84. Studs 132 extend from the flame tube ring 84 to receive a washer 134 with an elongated aperture 136 and a nut 138. Each stud 132 extends through an open aperture 140 in a flange 142 of the flame tube 82.

Figure 16:
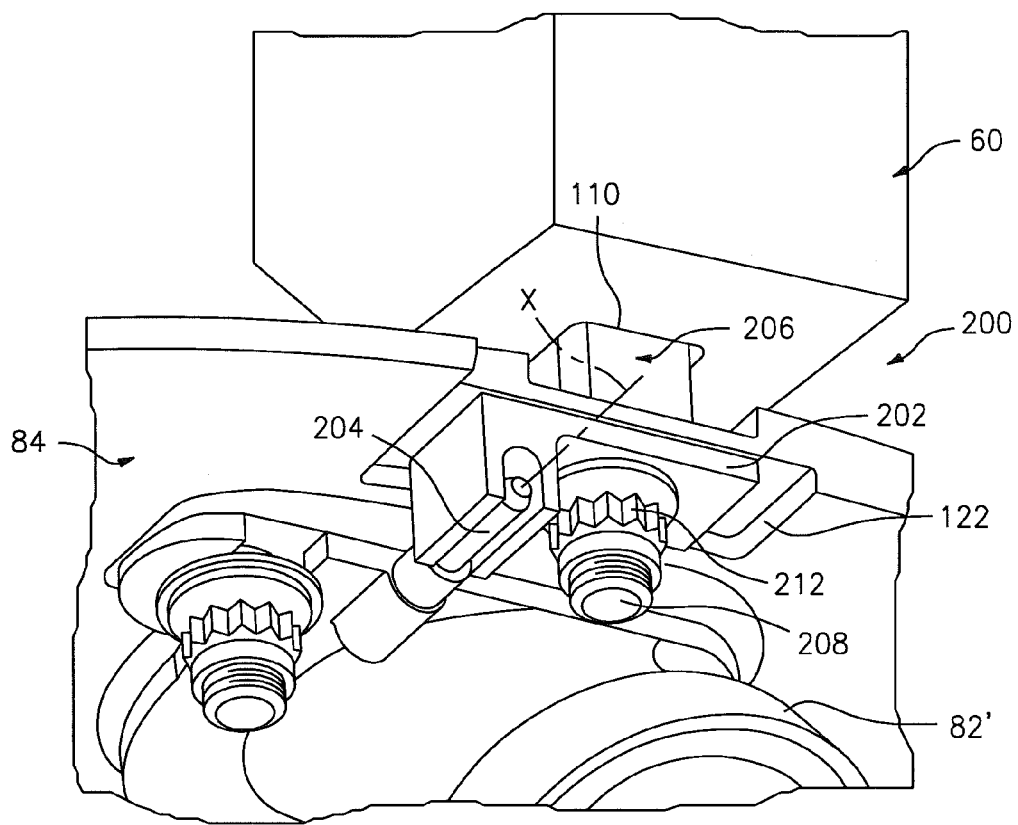
FIG. 16 is a perspective inner view of an alignment system according to another disclosed non-limiting embodiment.
Figure 17:
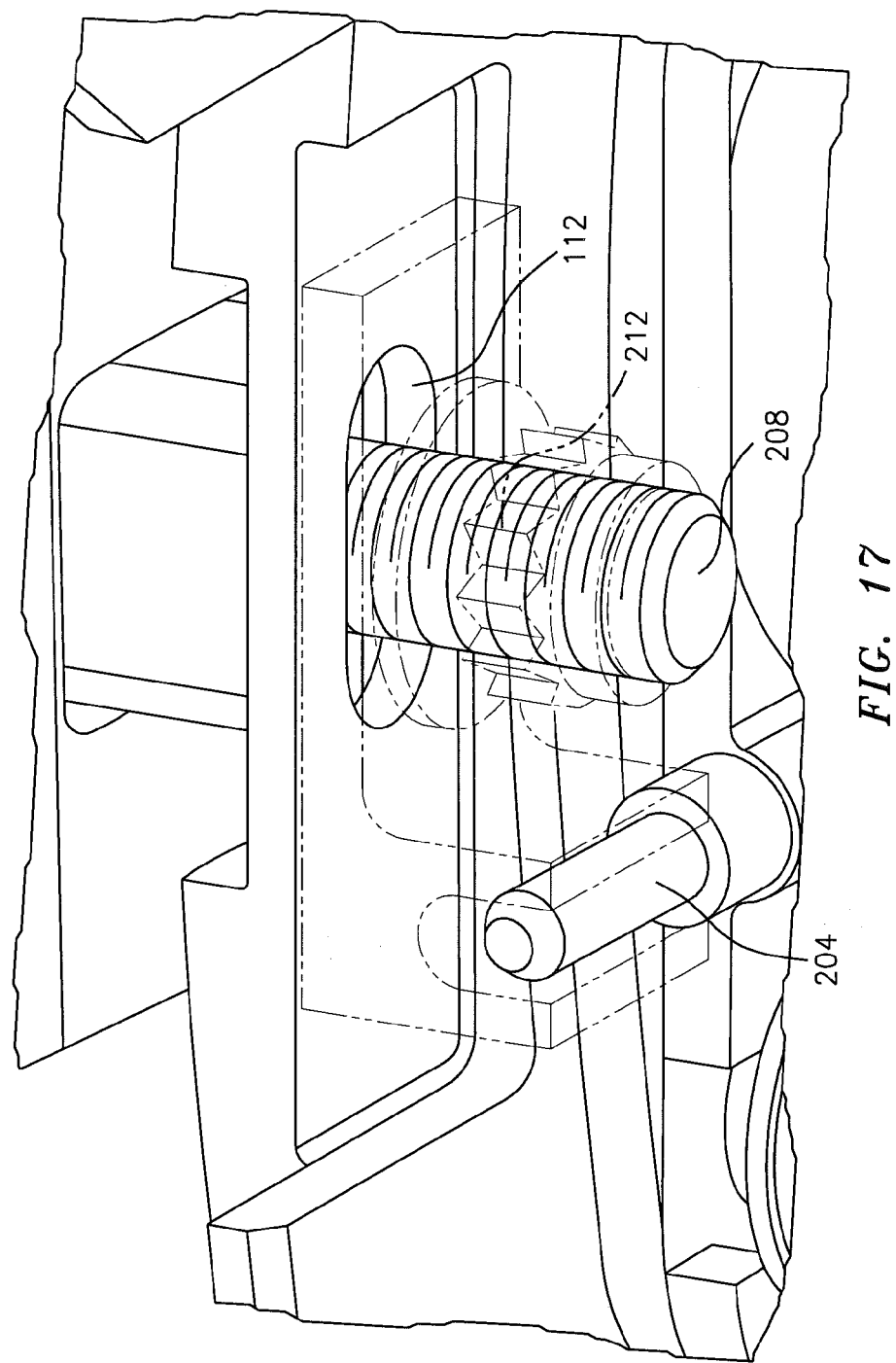
FIG. 17 is a perspective partial phantom inner view of the alignment system of FIG. 16.

With reference to FIG. 16, another disclosed non-limiting embodiment of an alignment system 200 includes a bracket 202 that receives a fastener 208 and a pin 204 that extends from the flame tube 82'. The pin 204 may be replaceable and may be, for example, be press fit or tack welded in place. The bracket 202 resides within the inner recessed area 122 to provide an anti-rotation interface and seal the elevated aperture 112 (FIG. 17). The bracket will not otherwise fit within the inner recessed area 122 and engage the pin 204 to provide a mistake-proof interface.

Figure 18:
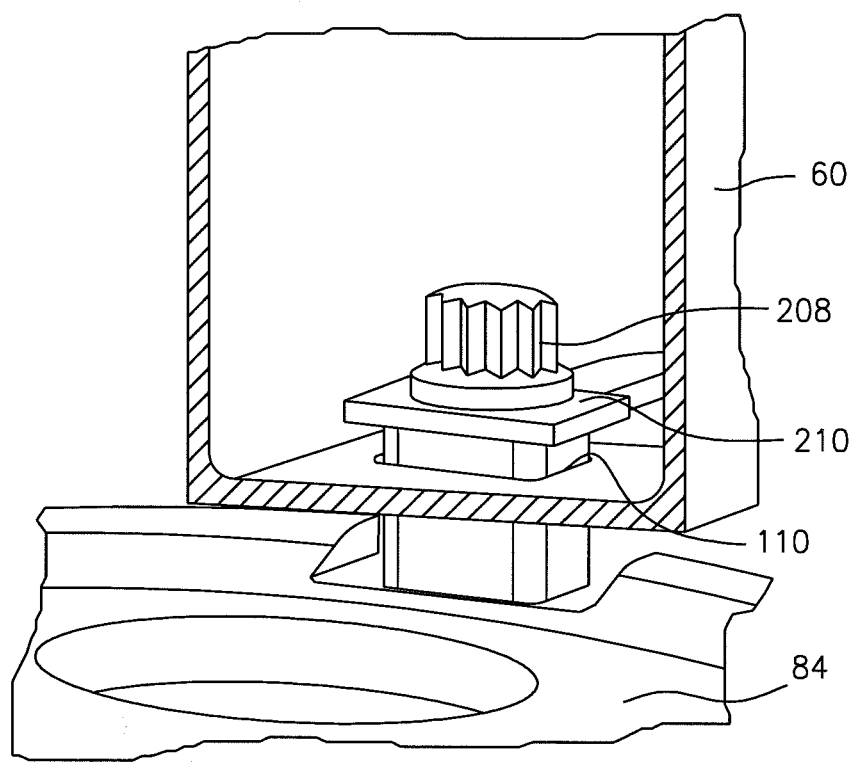
FIG. 18 is a perspective outer view of the alignment system of FIG. 16.

With continued reference to FIG. 16, the fastener 208 is received in a bushing 206 and may include a flange 210 to radially retain the trailing edge box 60 through which the bushing 206 is located (FIG. 18). That is, the bushing 206 is located through the aperture 110 in the trailing edge box 60 to account for circumferential and axial alignment as well as component tolerances. The fastener 208 is mounted through the bushing 206 and the bracket 202 to sandwich the flame tube ring 84 therebetween. A nut 212 is received on the fastener 208 to abut the bracket 202 and thereby facilitate engagement inspection/visibility of the bracket pin 204.

Figure 19:
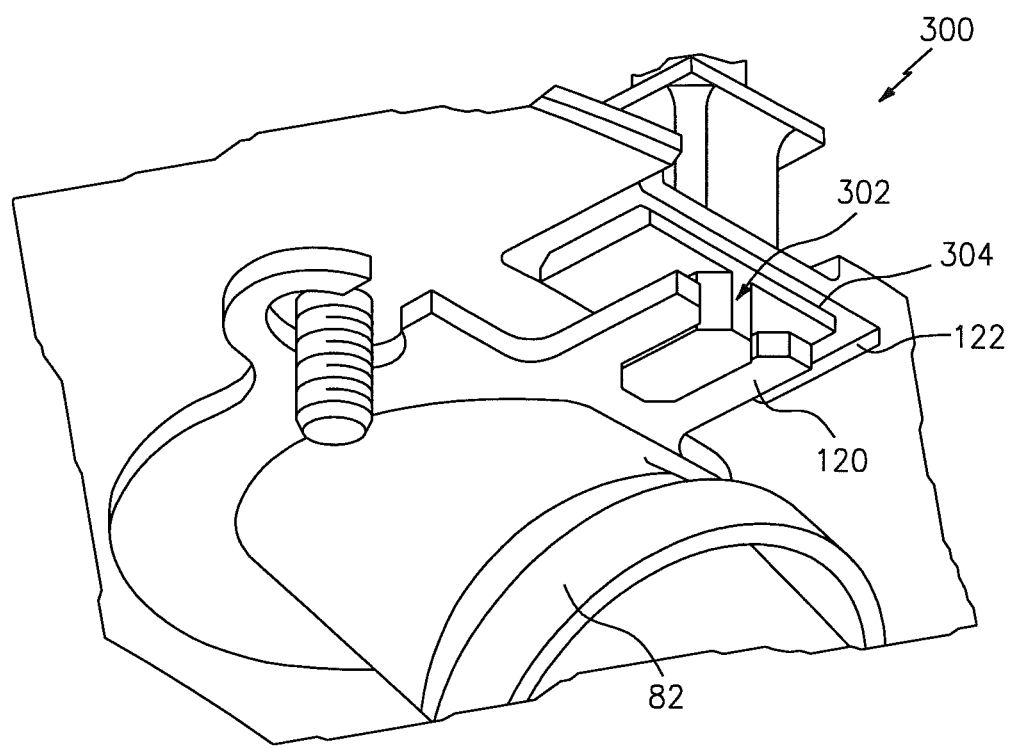
FIG. 19 is a perspective inner view of an alignment system according to another disclosed non-limiting embodiment.
Figure 20:
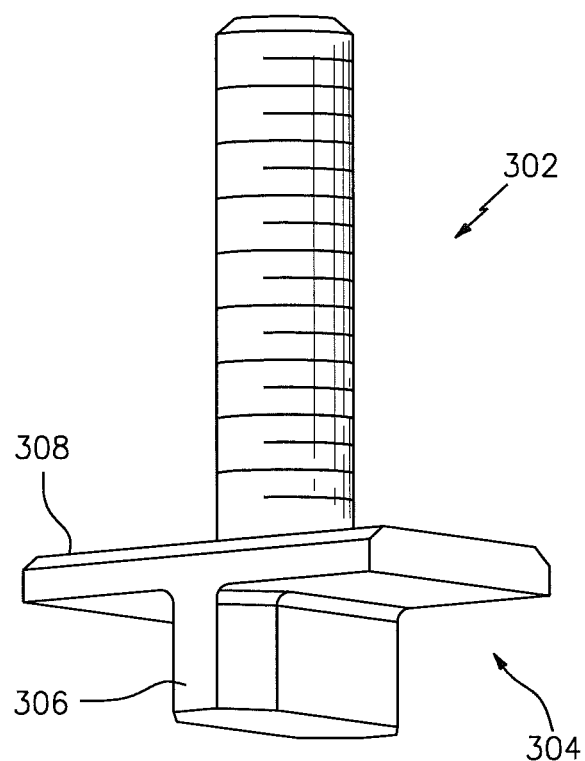
FIG. 20 is a perspective view of a "T" shaped fastener of the alignment system of FIG. 19.
Figure 21:
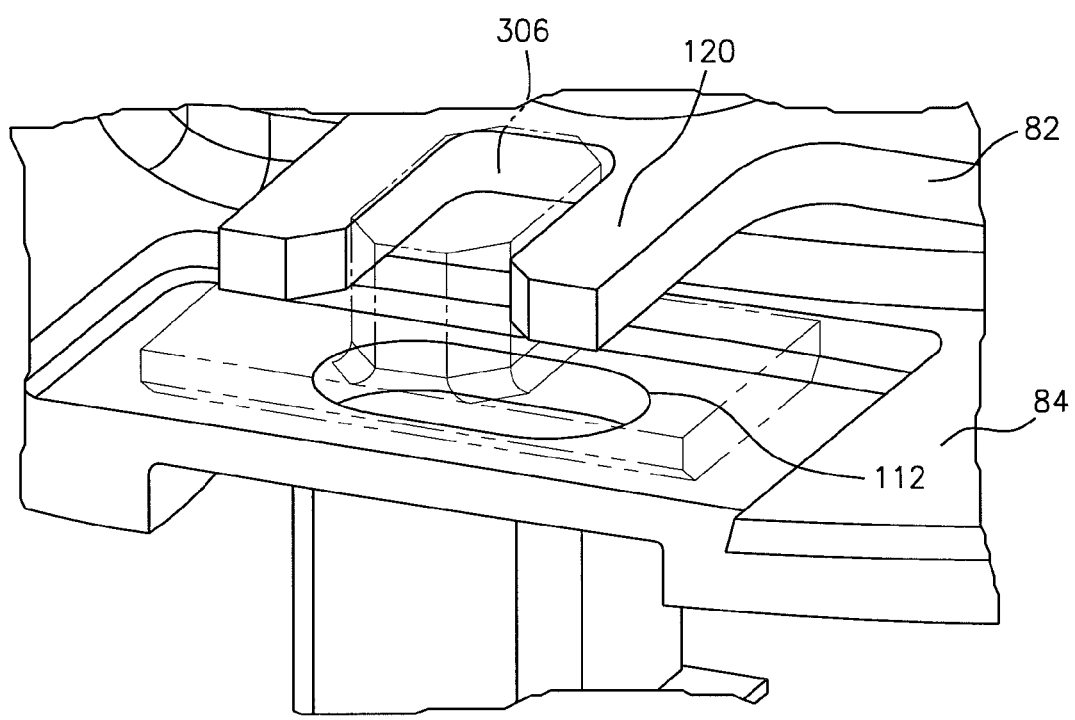
FIG. 21 is a perspective partial phantom inner view of the alignment system of FIG. 19.
Figure 22:
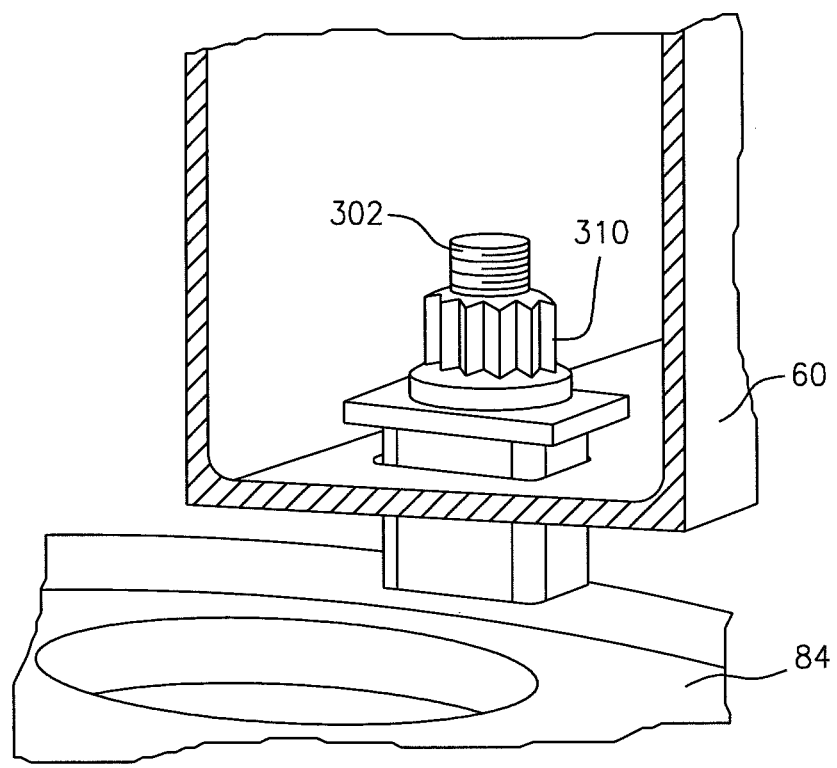
FIG. 22 is a perspective outer view of the alignment system of FIG. 19.

With reference to FIGS. 19 and 20, another disclosed non-limiting embodiment of an alignment system 300 includes a fastener 302 with an inverted "T" shaped head 304 with a base 306 that engages the fork 120 that extends from the flame tube 82. A top 308 of the inverted "T" shaped head 304 resides with the inner recessed area 122 to provide an anti-rotation interface and also operates as a seal for the elongated aperture 112 in the flame tube ring 84 (FIG. 21). A nut 310 may be located in the trailing edge box 60 (FIG. 22) which may facilitate engagement inspection/visibility in some environments.

Figure 23:
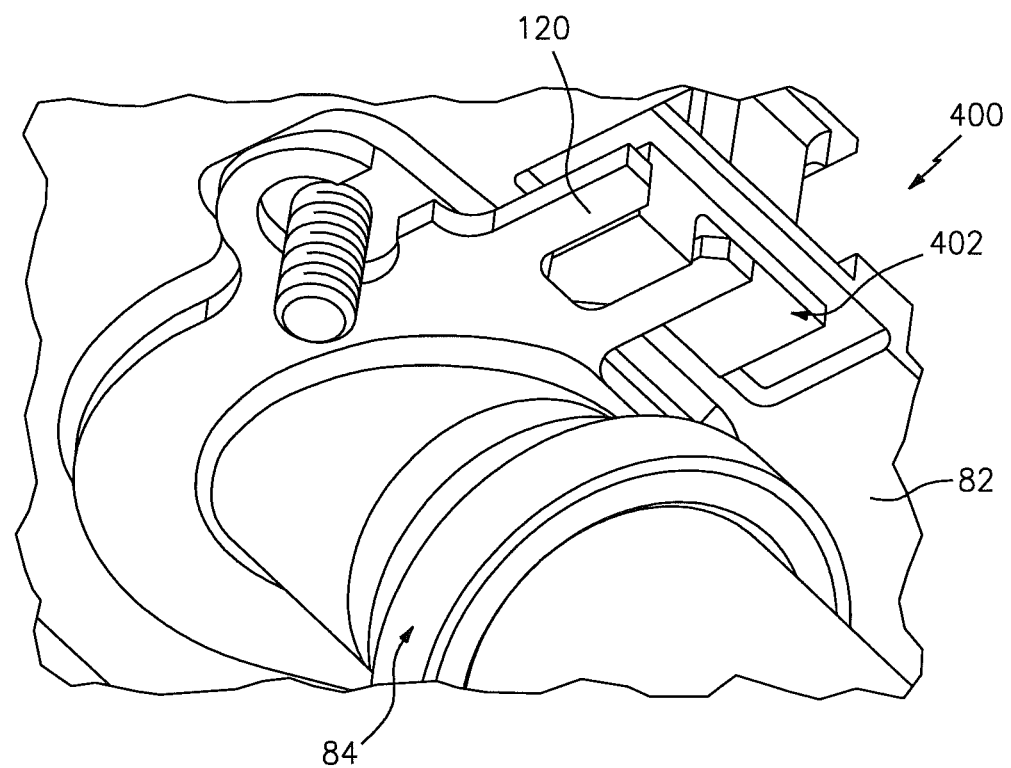
FIG. 23 is a perspective inner view of an alignment system according to another disclosed non-limiting embodiment.
Figure 24:
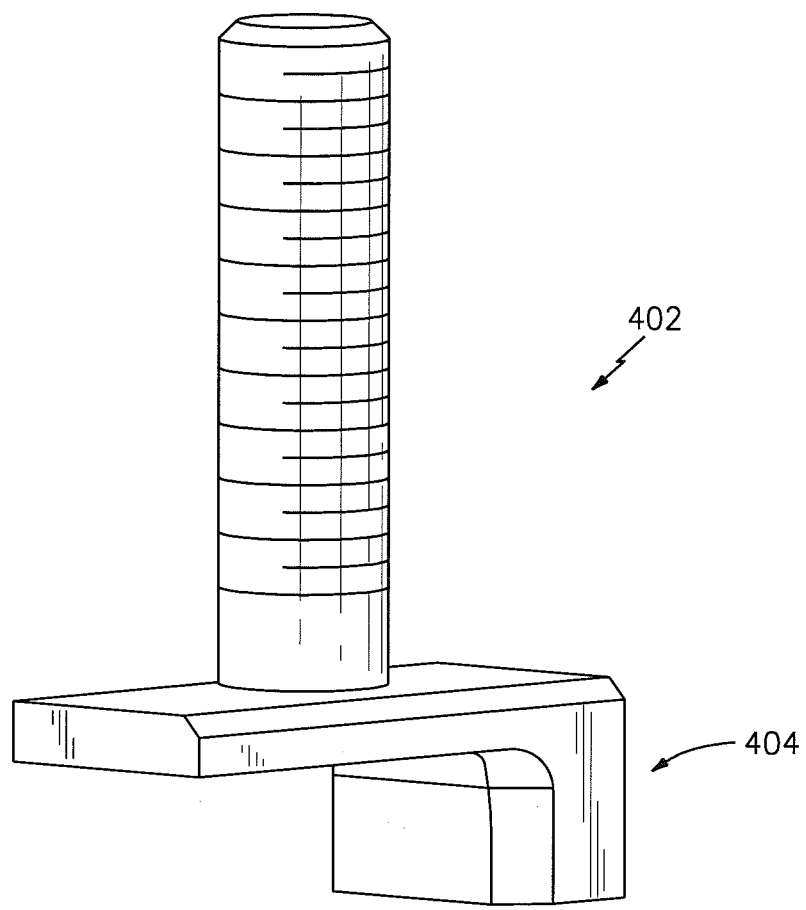
FIG. 24 is a perspective view of an "L" shaped fastener of the alignment system of FIG. 23.
Figure 25:
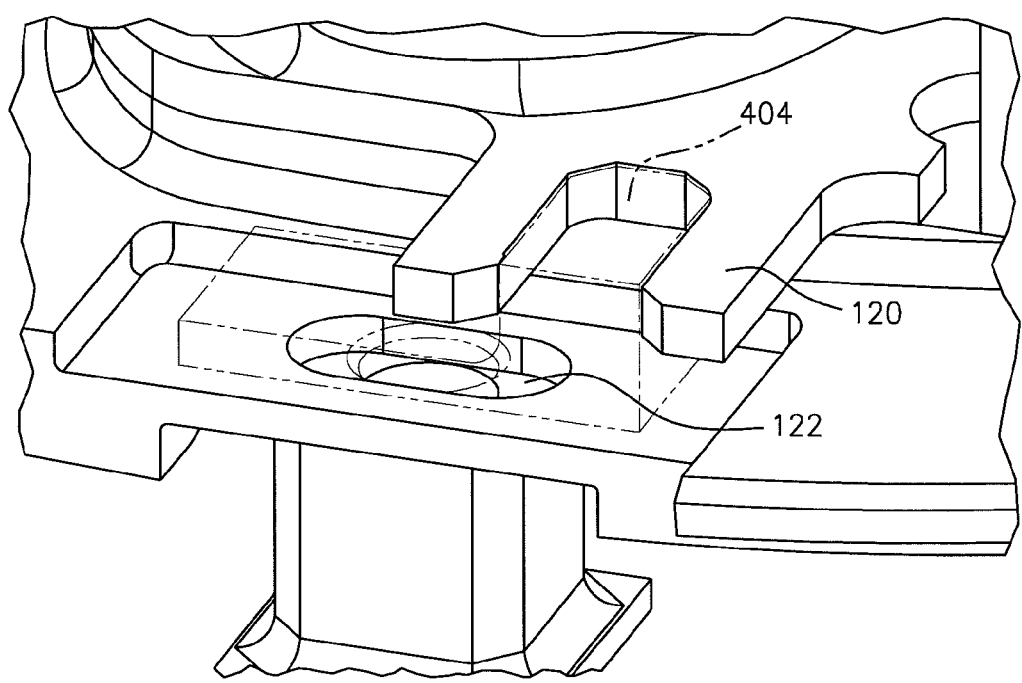
FIG. 25 is a perspective partial phantom inner view of the alignment system of FIG. 23.

With reference to FIGS. 23 and 24, another disclosed non-limiting embodiment of an alignment system 400 includes a fastener 402 with a "L" shaped head 404 that operates generally as described with respect to the inverted "T" shaped head 304. The shift from a "T" shape to an "L" shape may facilitate engagement and inspection/visibility in some environments (FIG. 25).

Figure 26:
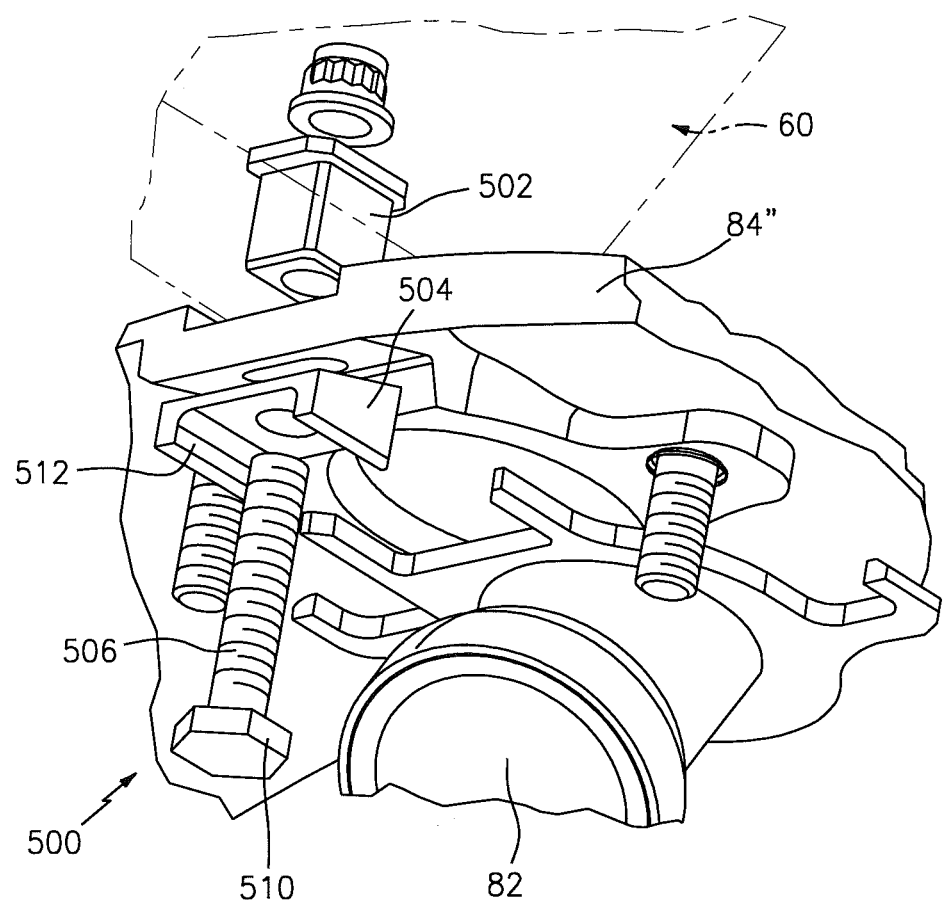
FIG. 26 is a perspective inner view of an alignment system according to another disclosed non-limiting embodiment.
Figure 27:
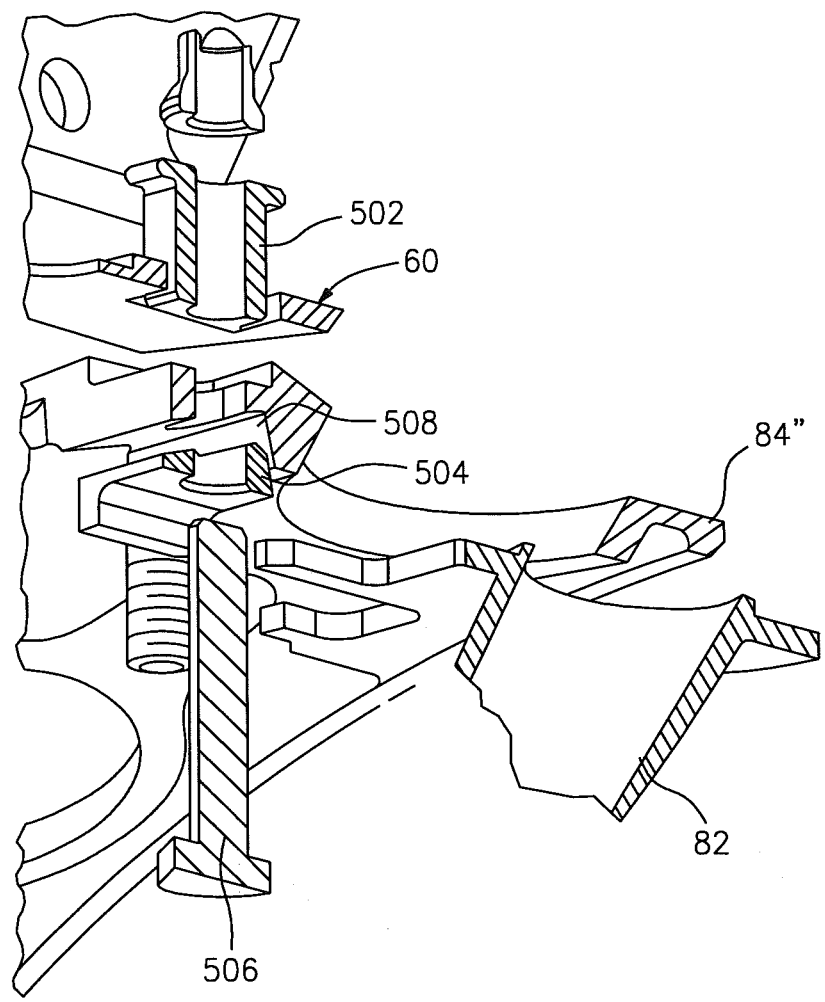
FIG. 27 is an exploded view of the alignment system of FIG. 26.

With reference to FIG. 26, another disclosed non-limiting embodiment of an alignment system 500 generally includes a bushing 502, a tapered bracket 504, a fastener 506 and a tapered recess 508 (FIG. 27) formed in a flame tube ring 84". The flame tube ring 84" includes a thickened region adjacent to the flame tube aperture to integrally define the tapered recess 508 in the flame tube ring 84".

Figure 28:
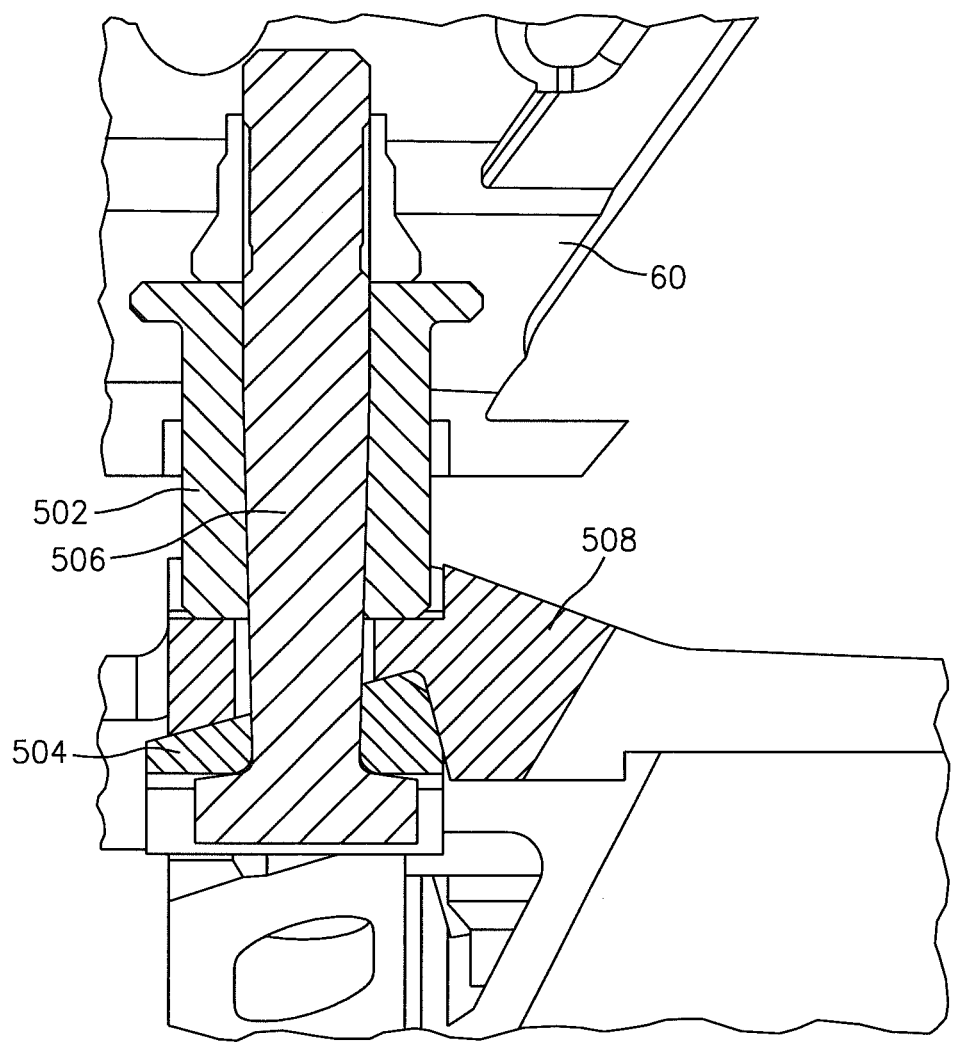
FIG. 28 is a sectional view of the alignment system of FIG. 26.

The sloped interface of the tapered interface between the tapered bracket 504 and the tapered recess 508 (FIG. 28) facilitates self-adjustment and anti-rotation as the fastener 506 is assembled through the bushing 502, tapered recess 508 and the tapered bracket 504. This eliminates a significant percentage of misalignment due to rocking. A head 510 of the fastener 506 is also anti-rotated by the sides 512 of the retapered bracket 504.

Figure 29:
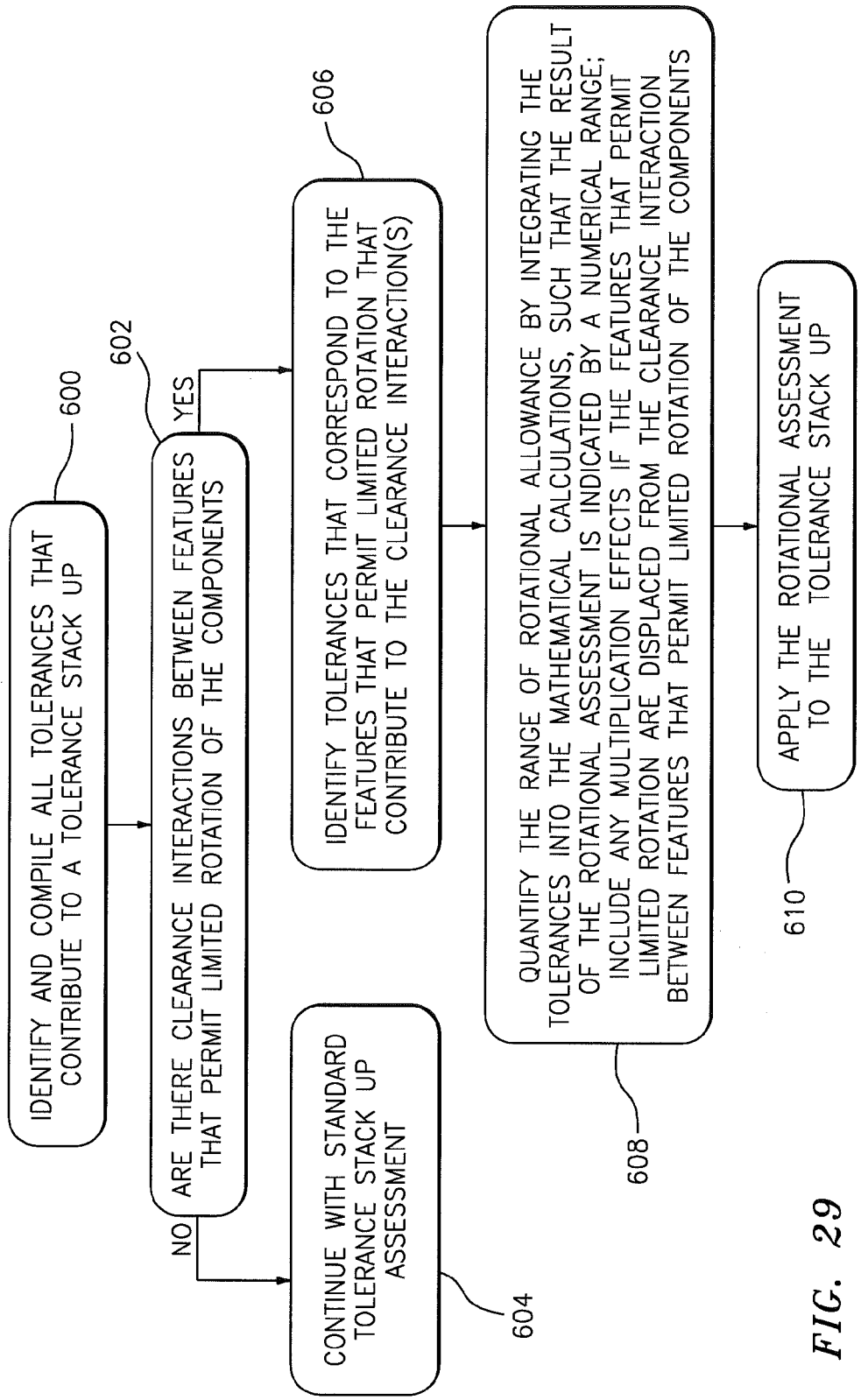
FIG. 29 is a flowchart illustrating an alignment assessment methodology.

With reference to FIG. 29, a design methodology of one disclosed non-limiting embodiment utilizes geometric and statistical mathematics to predict and improve variation control in the alignment between two or more components.

The functions of the design methodology are disclosed in terms of functional block diagrams, and it should be understood by those skilled in the art with the benefit of this disclosure that these functions may be enacted in either dedicated hardware circuitry or computer readable medium containing programming instructions capable of execution in a microprocessor based computing device.

In terms of hardware architecture, such a computing device may include a processor, memory, and one or more input and/or output (I/O) device interface(s) that are communicatively coupled via a local interface. In one non-limiting embodiment, the processor may be any type of known microprocessor with desired performance characteristics, the memory may, for example only, includes UVPROM, EEPROM, FLASH, RAM, ROM, DVD, CD, hard drive, or other which stores data as described herein. The interface facilitates communication and may, for example but not limited to, a keyboard, mouse, scanner, microphone, camera, proximity device, etc. Further, the I/O devices may also include output devices, for example but not limited to, a printer, display, etc., in either dedicated hardware circuitry or programmed software routines of computer readable medium capable of execution through a microprocessor based system.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

To predict and improve the control of variations in alignment between two or more components such as the aperture 110 of the trailing edge box 60 that is to be sized with respect to the bushing 92, all tolerances that contribute to a tolerance stack up are identified and compiled (step 600). Then, dependent upon whether there are clearances between the features that allow limited rotation, such as the bushing 92 which fits within the aperture 110 (step 602), either standard tolerance stack up assessment is continued (step 604) or the tolerances that corresponds to the features contributing to the clearance interaction are identified (step 606).

Figure 30:
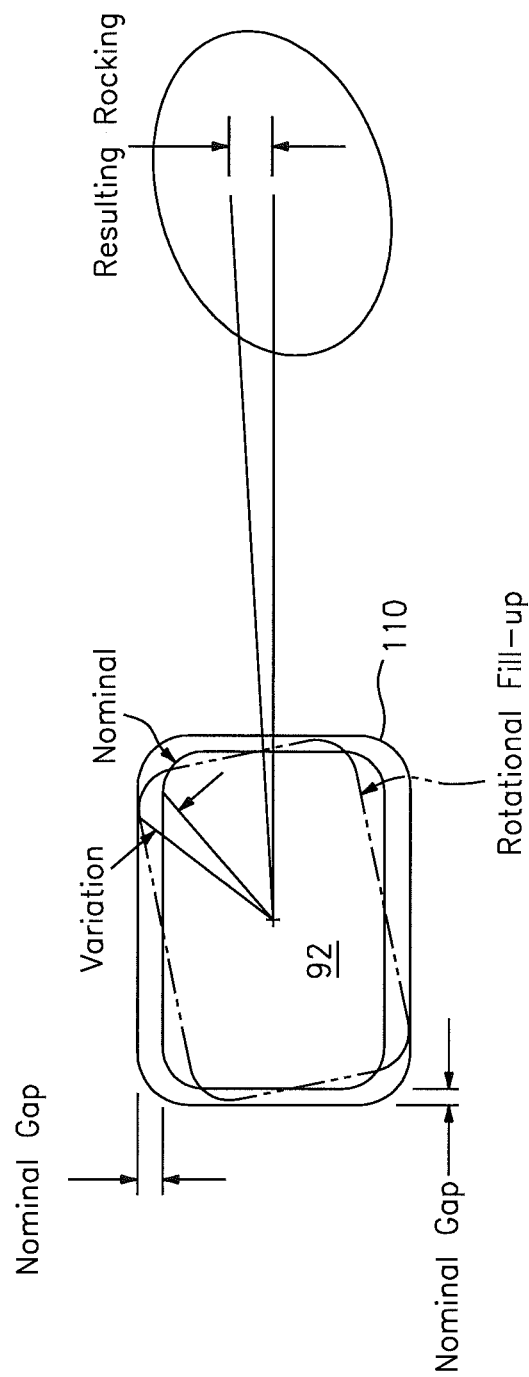
FIG. 30 is a schematic of the alignment assessment methodology for rocking tolerance calculation.

The range of rotational allowance is quantified by integrating the tolerances into the mathematical calculations, such that the result of the assessment is indicated by a numerical range with any multiplication effects included if the end-feature of interest is at a distance away from the clearance interaction (step 608). Finally, the rotational assessment is applied to the tolerance stack up to confirm that the resultant rocking is within a desired tolerance (step 610; FIG. 30). That is, the methodology accounts for various loose fits and secondary effects of features that permit limited rotation between components.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
a first component with an aperture;
a bushing that is non-round in cross-section, said bushing receivable within said aperture; and
a fastener which passes through the bushing to retain a second component to a third component with respect to said first component, said third component with an elongated aperture greater in size than said aperture, said elongated aperture located within a recess, wherein said bushing includes a set of tabs and said fastener includes a head receivable between said set of tabs, and wherein said fastener includes a rectilinear interface section that corresponds with a rectilinear bushing aperture through said bushing.

2. The gas turbine engine as recited in claim 1, wherein said first component is a trailing edge box within an augmentor section of said gas turbine engine.

3. The gas turbine engine as recited in claim 1, wherein said second component is a flame tube within an augmentor section of said gas turbine engine.

4. The gas turbine engine as recited in claim 1, wherein said third component is a flame tube ring within an augmentor section of said gas turbine engine.

5. The gas turbine engine as recited in claim 1, further comprising a pin which extends from said second component, said pin engageable with a bracket retained to said third component with said fastener.

6. The gas turbine engine as recited in claim 1, wherein said fastener includes an inverted "T"-shaped head.

7. The gas turbine engine as recited in claim 1, wherein said fastener includes an "L"-shaped head.

8. The gas turbine engine as recited in claim 1, wherein said recess is tapered and integral with said third component, further including a tapered bracket receivable in said tapered recess, said tapered bracket retained to said third component with said fastener.

* * * * *